H. HENDERSON.
MOLD RAMMING APPARATUS.
APPLICATION FILED APR. 23, 1908.
931,200. Patented Aug. 17, 1909.
5 SHEETS—SHEET 2.
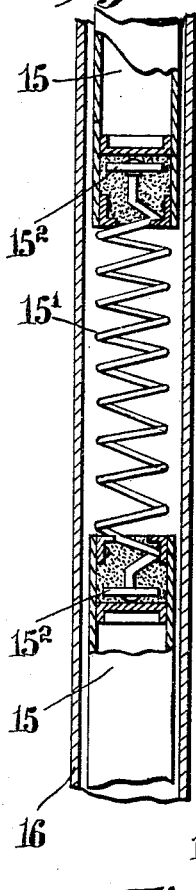
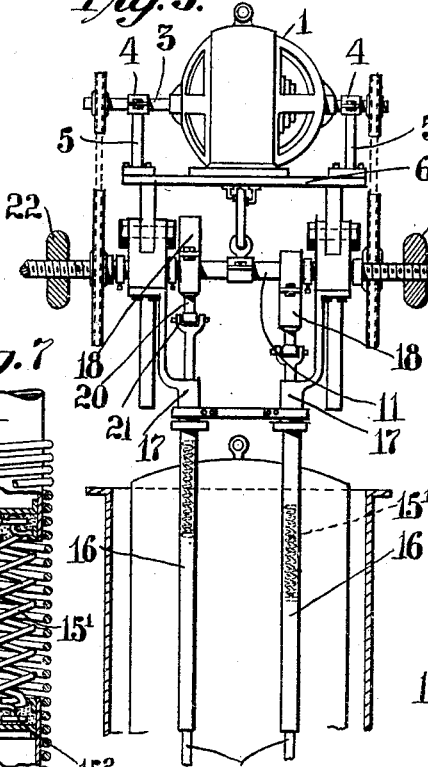
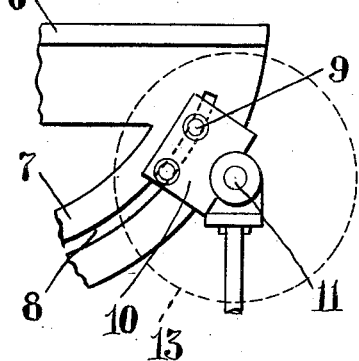
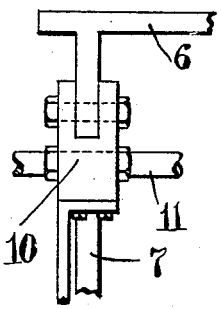
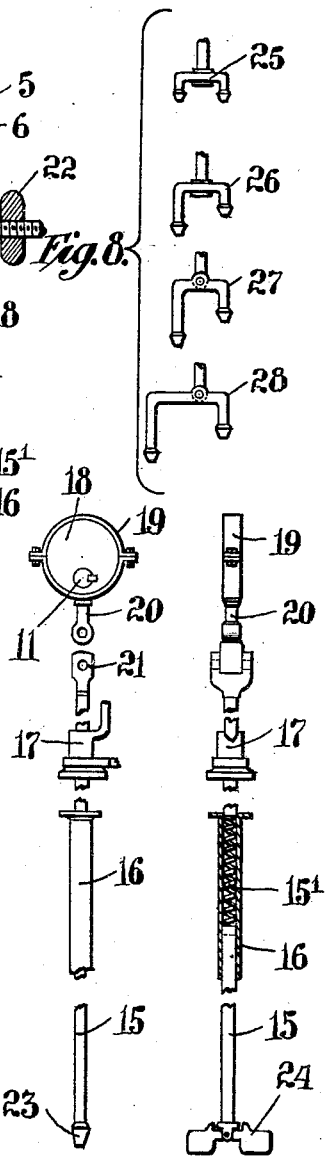
Attest:
Inventor:
Henry Henderson
by Edward C. Davidson
Atty

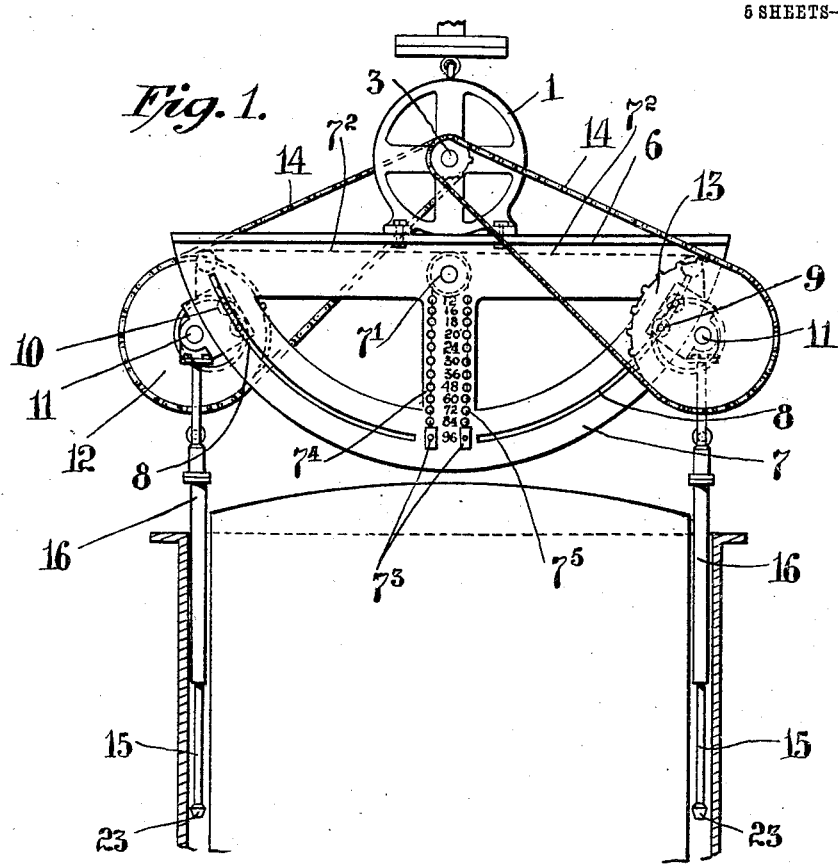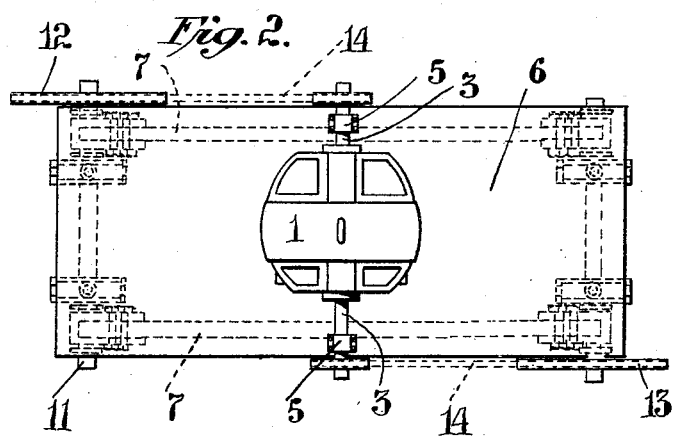

H. HENDERSON.
MOLD RAMMING APPARATUS.
APPLICATION FILED APR. 23, 1908.

931,200.

Patented Aug. 17, 1909.
5 SHEETS—SHEET 3.

Attest:
Mitchell
L. F. Browning

Inventor:
Henry Henderson
by Edward C. Davidson
Atty

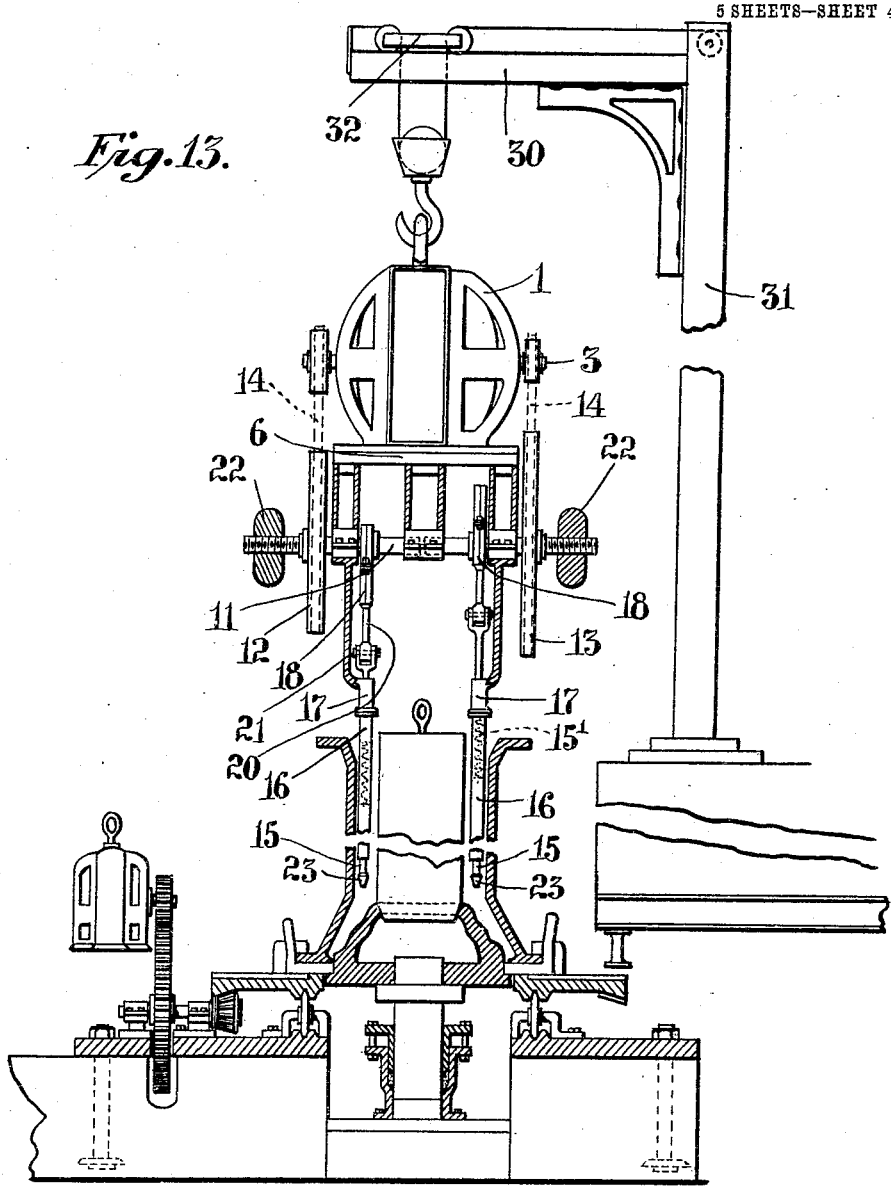

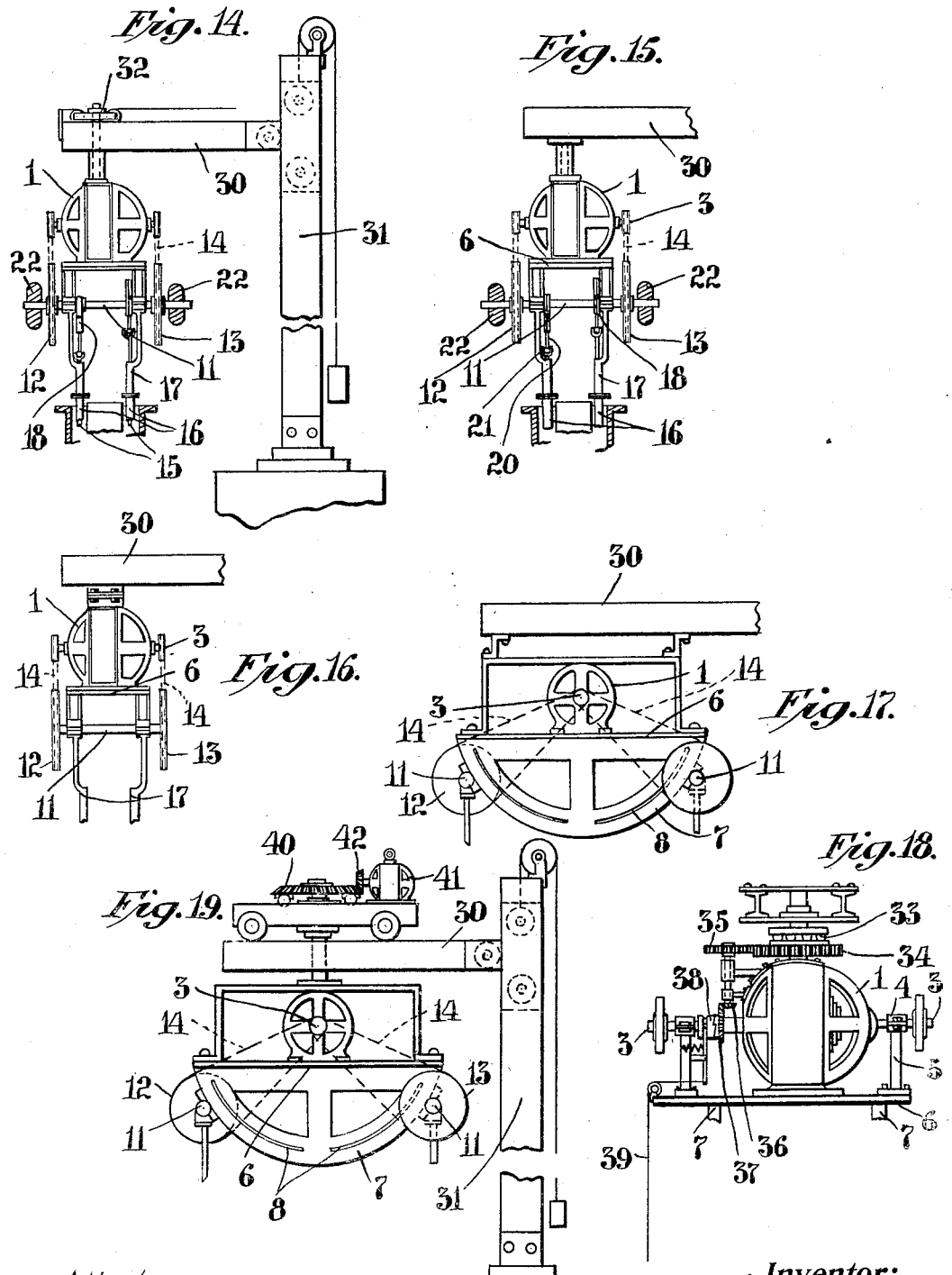

UNITED STATES PATENT OFFICE.

HENRY HENDERSON, OF NEW YORK, N. Y.

MOLD-RAMMING APPARATUS.

No. 931,200.  Specification of Letters Patent.  Patented Aug. 17, 1909.

Application filed April 23, 1908. Serial No. 428,870.

*To all whom it may concern:*

Be it known that I, HENRY HENDERSON, a citizen of the United States of America, residing in the borough of Manhattan, city, county, and State of New York, have invented certain Improved Mold - Ramming Apparatus, of which the following is a specification.

This invention relates to mold ramming apparatus wherein a plurality of rammers may be operated from a single motor. They may be operated at different speeds, given different lengths of stroke, and the timing of their strokes may be varied or controlled. For some reasons, therefore, it is best that a rotary motor be employed, although in the broader aspects of this invention it is not necessary that such should be the case.

A further feature of the invention is that the points of suspension of the rammers may be adjusted with reference to the radius of the mold to be rammed. When a rotary motor is used the several rammers, whether there be one or a plurality, may be respectively operated by a crank or eccentric on a shaft or shafts that may be appropriately driven from the motor shaft. For some reasons such arrangement is considered desirable as compared with placing the rammer actuating cranks or eccentrics directly on the motor shaft. The crank or eccentric shaft or shafts may be adjusted in the arc of a circle, of which the motor axis is the center, to vary the radius of the point of support of the rammer shaft.

The invention also comprises constructions or arrangements hereinafter set forth.

Primarily, the apparatus is designed for the ramming of pipe molds.

Figure 11:
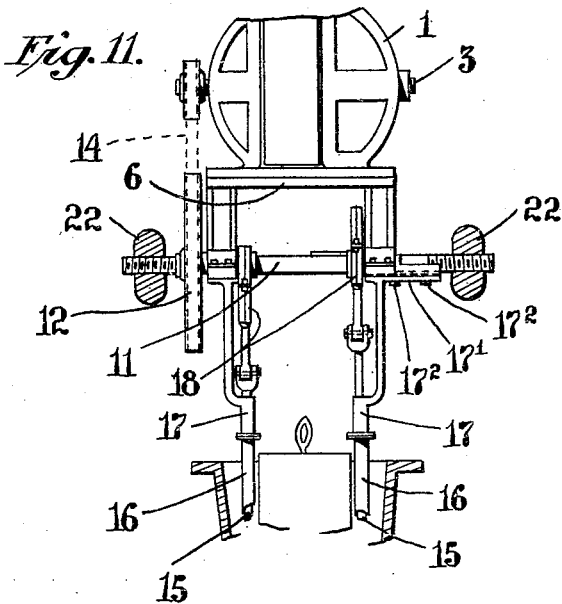
Figure 12:
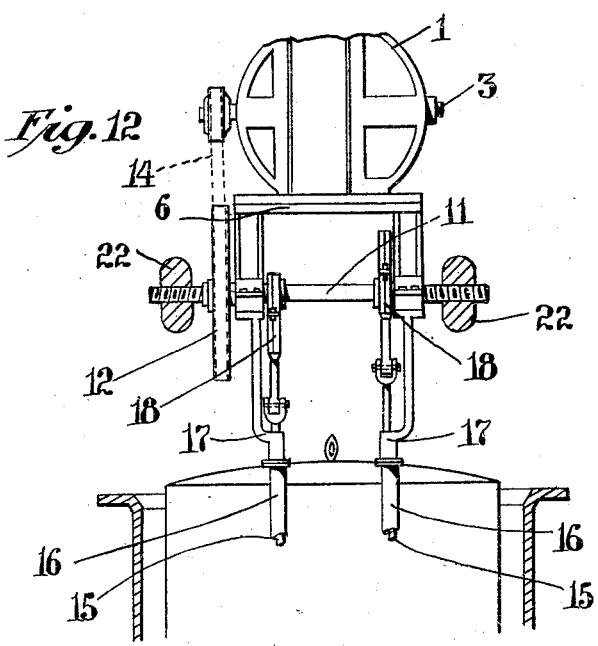

In the accompanying drawing: Figure 1 is a detail side elevation with a portion of the mold indicated in section: Fig. 2, a plan view thereof: Fig. 3, an end elevation: Fig. 4, an enlarged detail showing the manner of adjusting and mounting the bearing box of the eccentric or crank shaft: Fig. 5, a detail view of the parts indicated in Fig. 4 at right angles thereto: Fig. 6, an enlarged detail sectional view indicating a way in which the rammer shaft may be composed in part of a compressible spring of suitable resistance, and the guiding and handling tube in which the rammer shaft is inclosed: Fig. 7, a similar view indicating that the guiding sleeve may be composed of a spirally coiled wire or metal bar encircling the rammer shaft: Fig. 8 shows in detail several forms of pivoted and set bits that may be attached to the rammer shaft: Figs. 9 and 10 are respectively detailed views showing the manner of connecting the rammer shaft with its operating eccentric: Fig. 11 is an elevation showing two rammer shafts actuated from a common shaft by eccentrics and operating upon diametrically opposite sides of a pattern: Fig. 12 is a similar view showing the same construction except that the rammer shafts are arranged to operate in a comparatively small arc at one side of a large pattern: Fig. 13 is a general view partly in section showing a rotary mold and crank or eccentric operated rammer shafts driven by a rotary motor suspended from an over-head frame or derrick. Figs. 14, 15, 16 and 17 show respectively different modes of suspending or supporting the motor frame; and Figs. 18 and 19 show ways in which the suspended motor and associated parts may be revolved about a vertical axis.

In Figs. 1, 2 and 3, 1 indicates a rotary motor, which may be electric, adapted to be flexibly or otherwise suspended by an eye or flange on the motor frame. The suspending apparatus may be such that the motor and associated parts may be adjusted circumferentially around a center of motion, radially with respect thereto and vertically with respect to the mold as indicated in my Patent No. 876,054 of January 7, 1908 or otherwise. The shaft 3 of the motor is shown as turning in bearings 4, 4, in standards 5, 5, carried by a base plate 6 on which is secured the frame of the motor. Bolted or cast to the under face of the base plate 6, adjacent its opposite sides are parallel frame plates 7 having the form of sectors of a circle, being as shown approximately semi-circular. These pendent frame plates have corresponding curved grooves 8 struck from the axis of the motor. Rigidly, but adjustably secured to the plates 7 by means of clamp bolts 9 passing through the slots 8 are bearing blocks 10 in appropriate bearings in which revolve the crank or eccentric shafts 11. One end of one of the shafts carries a pulley or sprocket wheel 12 and the opposite end of the other shaft carries a similar pulley or sprocket 13, and these wheels are connected by belts or sprocket chains 14 to pulleys on the ends of the motor shaft. This construction affords a wide range of adjustments of the crank shafts which may be swung approximately to the center of the supporting frame since their operating pulleys or sprocket wheels are disposed on opposite sides of the frame. Each shaft 11 may operate one or more rammer shafts 15 that are guided in vertically disposed tubes 16 carried by brackets 17 secured to the bearing boxes of the crank shafts. In this instance, reciprocation of the rammer shafts is effected by eccentrics 18, keyed to the shaft and whose rings 19 have pendent apertured lugs 20 embraced by apertured forked ends 21 of the rammer shafts 15. As indicated in Fig. 3 and in some of the other figures, the driven crank or eccentric shafts 11 may be extended at each side and threaded for the reception of tapped weights 22 capable of adjustment in and out on the shaft and serving as fly wheels and as means for balancing the motor, its frame and attached parts. This is considered to be a desirable although not necessary feature where the motor is flexibly suspended. The sleeve 16 may be grasped by the workman to control the position vertically of the rammer shafts the operating connections of which are such as to allow of a reasonable amount of displacement from a vertical line. Their primary purpose, however, is to act as mere guides within which the rammer shafts reciprocate. They insure free movement of the shafts when, because of sufficient displacement from true vertical position, the sleeves may bind between the flask and core. Moreover a feature of the invention making the use of the guide sleeves desirable is that the shafts are formed in part of a coiled spring, or yielding section, of suitable strength. The spring 15' is shown in detail in Fig. 6 where also the rigid part or body of the rammer shaft 15 is indicated as tubular. The respective ends of the spring have attached thereto disks or heads $15^2$ that are appropriately rigidly secured to the tubes or sections 15 by being seated in the ends thereof and held by metal cast around them. Fig. 7 shows the same general construction in addition to which the tube 16 is composed of a coiled wire or metal bar 16'. The sleeves serve to preserve the alinement of all parts of the shaft when it has a yielding section such as 15'. The interposition of a spring in the length of the rammer shaft gives elasticity to the operation of the apparatus and absorbs upward jars or strains that would be imparted to the eccentric shaft. The rammer shaft may have a single bit 23 such as shown in Figs. 1 and 9 or there may be pivoted to the end of the shaft a double headed or pointed bit of a kind, for instance, shown in Fig. 10 where the bit 24 has symmetrical heads as has also the bit 25 in Fig. 8 or one head may be shorter than the other and the pivotal connection with the shaft be varied as indicated at 26, 27 and 28. When the motor is of sufficient power to effectively operate the double-head bits, the operation of ramming a model is more efficiently accomplished.

Figs. 11 and 12 show a slightly different organization of the apparatus. The eccentric shaft 11 is mounted in a frame depending from a base plate 6. The rammer shafts are driven by eccentrics as before. In this case one of the eccentrics is shown as capable of adjustment along a key on the shaft. The bracket 17 carrying the corresponding guide tube is formed with a flange extension 17' adjustably connected with a corresponding extension on its frame support by a dovetail way, and held in desired position by clamp bolts $17^2$.

In Fig. 11, the two rammer shafts are shown as working upon diametrically opposite sides of a pipe pattern of relatively small diameter; whereas in Fig. 12 the rammer shafts similarly spaced are shown as working upon the one side of a pattern of larger diameter. By providing for adjustment of the eccentrics on their shafts, the juxtaposition of the rammer shafts may be varied at will.

In the construction of Figs. 11 and 12, the rammer shafts may be, and preferably are, formed with a yielding section, composed, for instance, of such a spring as 15'.

Fig. 13 shows an organization similar to Figs. 11 and 12 except that there are two eccentric shafts in alinement, their contiguous ends having bearings in a central hanger on the base plate or frame, and each shaft is independently driven from the motor shaft. This permits, as is shown, of driving the two rammer shafts at different speeds. This figure indicates a revolving flask of ordinary construction of which description is unnecessary. The spring sections of the rammer shafts are indicated by the dotted lines. The motor is shown as suspended from a cable passing over pulleys on a truck traveling on a horizontally disposed platform located at the upper end of a vertical post or standard somewhat after the manner described in my prior patent. Any appropriate arrangement in this respect may be adopted. It may be desirable that the motor and associated parts shall be supported rigidly so that it will not be swung or oscillated by the jars imparted to it by impact of the rammer shaft bits upon the sand of the mold. Thus, in Fig. 14 the horizontal platform 30 is capable of vertical movement on the standard or post 31 being counter weighted as indicated, and on the platform runs a truck 32 with which the motor 1 is rigidly connected. In Fig. 15, the motor is shown as rigidly connected with the platform 30. Other modes of rigidly mounting the motor and its associated parts are indicated in Figs. 16, 17. The constructions are obvious and ordinary and specific description seems unnecessary.

In Fig. 18 is indicated a rotary motor (adapted to drive a plurality of rammers) suspended from a rotary support 33 that is revolved at appropriate regulated speed from the motor shaft by the driving connections 34, 35, 36 and 37. This support may be capable of adjustment in a horizontal arc, radially with respect to the center of the arc and vertically, in the ways herein shown or disclosed in my prior patent. The rammer shafts having been adjusted to the radius of the flask their support, carried concentrically above the flask, may be automatically revolved. The operation may be controlled by a clutch 38 splined on the motor shaft and adapted to engage the bevel gear 37 loose on said shaft. The clutch may be controlled from below by a cord 39.

In Fig. 19 the motor is suspended from a bevel gear 40 turning on bearing balls on a track in which its vertical shaft has its bearings. The motor and associated parts are supported by said shaft which is revolved by a supplementary electric motor 41 on whose shaft is a bevel pinion 42 meshing with the bevel wheel 40. The circuit of the motor 41 may of course be controlled at any desired point.

A convenient way of determining the adjustment of the rammer shafts to flasks of known radius is shown in dotted lines in Fig. 1. A grooved pulley 7' is mounted on a bearing on the inner face of one of the segmental side plates of the frame, or on the bottom face of the platform. Two cords 7² having their ends attached to points coincident with the axes of the respective eccentric shafts and movable therewith when the shafts are adjusted, pass in opposite directions over the pulley 7' and have attached to their free ends blocks or weights 7³. In the vertical web 7⁴ connecting the middle of the arc of one of the sector side plates 7 with the base plate 6 are two vertical parallel series of holes 7⁵ respectively opposite the pendent free ends of the cords 7². Opposite, or corresponding, holes of the two series are marked with figures indicative of the radius and the blocks 7³ are apertured to receive pins that pass into the holes 7⁵.

I claim:

1. Mold ramming apparatus comprising the combination of a vertically adjustable suspended motor and a plurality of flexibly suspended mold rammers actuated thereby.

2. Mold ramming apparatus comprising the combination of a horizontally and vertically adjustable suspended motor and a plurality of flexibly suspended mold rammers actuated thereby.

3. Mold ramming apparatus comprising the combination of a vertically adjustable flexibly suspended motor and a plurality of flexibly suspended mold rammers actuated thereby.

4. Mold ramming apparatus comprising the combination of a horizontally and vertically adjustable flexibly suspended motor and a plurality of flexibly suspended mold rammers actuated thereby.

5. Mold ramming apparatus comprising the combination of a vertically adjustable suspended motor, a plurality of mold rammers actuated thereby and means for adjusting the rammers to adapt them to circular flasks of different diameters.

6. Mold ramming apparatus comprising the combination of a horizontally and vertically adjustable suspended motor, a plurality of mold rammers actuated thereby and means for adjusting the rammers to adapt them to circular flasks of different diameters.

7. Mold ramming apparatus comprising the combination of a horizontally and vertically adjustable suspended motor, a plurality of mold rammers actuated thereby and means for independently adjusting the mold rammers to vary the relation between them.

8. Mold ramming apparatus comprising the combination of a vertically adjustable suspended motor, a plurality of suspended mold rammers actuated thereby and means for adjusting the radius of the points of suspension of the rammers with respect to the point of suspension of the motor.

9. Mold ramming apparatus comprising the combination of a vertically and horizontally adjustable suspended motor, a plurality of flexibly suspended mold rammers actuated thereby and means for adjusting the radius of the points of suspension of the rammers with respect to the point of suspension of the motor.

10. Mold ramming apparatus comprising the combination of a flexibly suspended motor and a plurality of flexibly suspended mold rammers actuated thereby.

11. Mold ramming apparatus, comprising the combination of a flexibly suspended counterbalanced motor and a plurality of flexibly suspended mold rammers actuated thereby.

12. Mold ramming apparatus, comprising the combination of a flexibly suspended vertically and horizontally adjustable counterbalanced motor, a plurality of suspended mold rammers actuated thereby, and means for adjusting the rammers to adapt them to circular flasks of different diameters.

13. Mold ramming apparatus, comprising the combination of a flexibly suspended counterbalanced motor, a plurality of mold rammers actuated thereby, and means for independently adjusting the mold rammers to vary the relation between them.

14. Mold ramming apparatus, comprising the combination of a suspended motor, a plurality of mold rammers operated thereby, and means whereby a different stroke may be imparted to the respective rammers.

15. In mold ramming apparatus a rammer shaft, comprising a compressible and extensible elastic section.

16. In mold ramming apparatus a rammer shaft, comprising a compressible and extensible elastic section, and a guide sleeve enveloping the rammer shaft.

17. Mold ramming apparatus, comprising the combination of a power driven horizontal shaft, a vertically reciprocal rammer shaft comprising an elastic compressible and extensible section, and a crank or eccentric connection between it and the driven shaft.

18. A flexibly suspended rammer shaft for mold apparatus having a head with ramming bits of unequal length.

19. A flexibly suspended rammer shaft for mold apparatus having pivoted thereto a head with ramming bits of unequal length.

20. A flexibly suspended rammer shaft for mold apparatus having pivoted thereto a head having ramming bits of unequal length disposed at different distances from the axis of the shaft.

21. Mold ramming apparatus comprising a suspended motor, a plurality of rotary shafts driven therefrom and rammer shafts reciprocated by the rotary shafts.

22. Mold ramming apparatus comprising a suspended motor, a plurality of rotary shafts driven therefrom, means for adjusting the shafts concentrically to the motor, and rammer shafts reciprocated by the rotary shafts.

23. Mold ramming apparatus comprising a flexibly suspended motor, a plurality of rotary shafts driven therefrom, and a plurality of rammer shafts reciprocated by the rotary shafts.

24. Mold ramming apparatus comprising a suspended motor, a plurality of rammer shafts operated thereby, means for adjusting the distance between the rammer shafts, and a scale indicating the adjustment.

25. Mold ramming apparatus comprising a suspended motor, a plurality of rammer shafts actuated thereby and means for automatically revolving the rammer shafts bodily in a circle about a vertical axis.

26. Mold ramming apparatus comprising a suspended motor, a plurality of rammer shafts actuated thereby, and means for automatically revolving the rammer shafts by the power of the motor about a vertical axis in a circle corresponding with that of the mold cavity.

27. Mold ramming apparatus comprising a motor, a rammer shaft reciprocated thereby and means for automatically revolving the rammer shaft bodily in a circle about a vertical axis.

28. Mold ramming apparatus comprising a motor, a rammer shaft actuated thereby, and means for automatically revolving the rammer shaft bodily by the power of the motor about a vertical axis co-incident with that of the mold cavity.

In testimony whereof, I have hereunto subscribed my name.

HENRY HENDERSON.

Witnesses:
WM. ST. G. KENT,
J. L. ADAMS.